Jan. 21, 1936.  E. MROSS  2,028,408
FOOD MIXER
Filed May 23, 1932
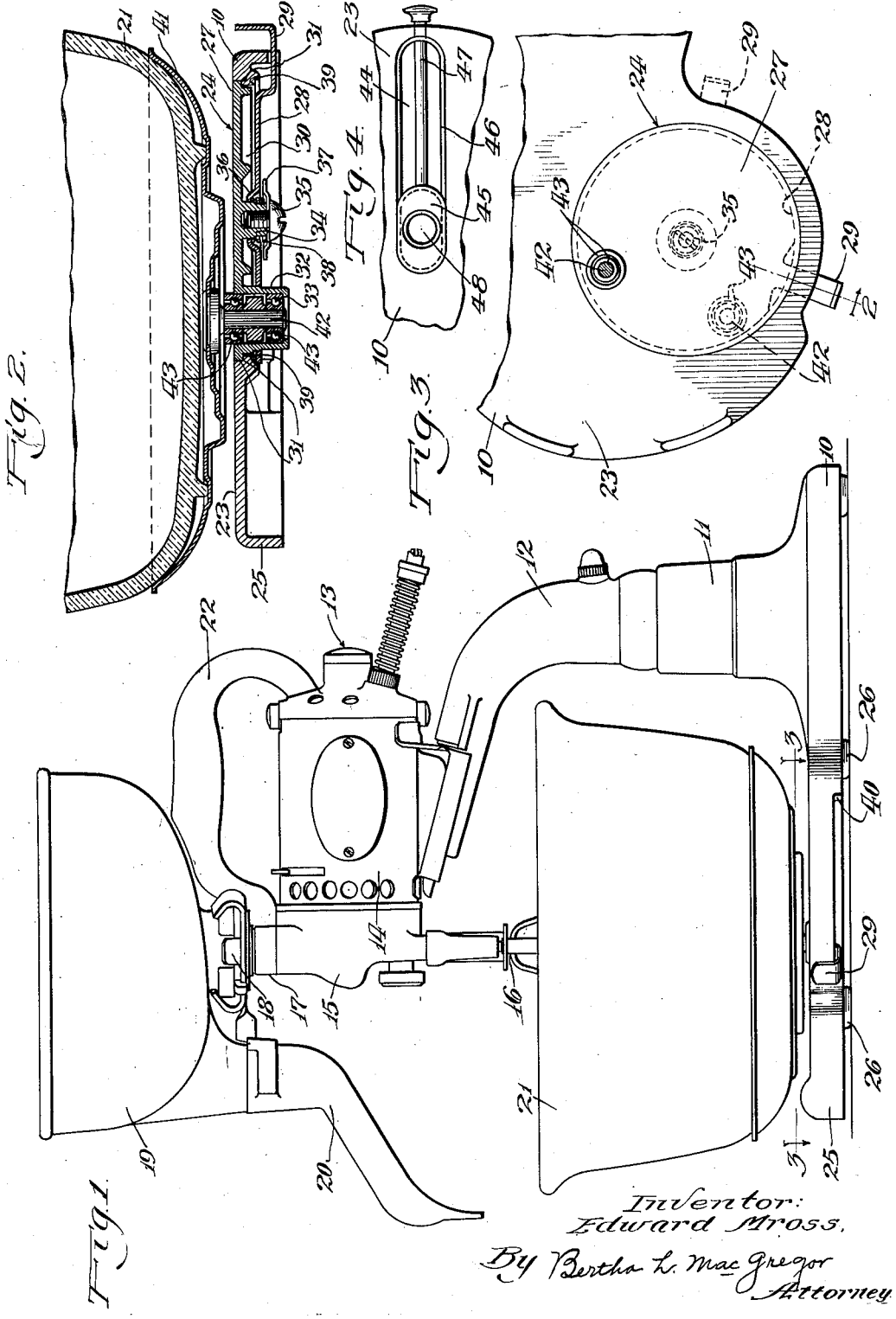
Inventor:
Edward Mross.
By Bertha L. MacGregor
Attorney Patented Jan. 21, 1936

2,028,408

UNITED STATES PATENT OFFICE 2,028,408

FOOD MIXER

Edward Mross, Racine, Wis., assignor to Hamilton Beach Manufacturing Company, Racine, Wis., a corporation of Wisconsin Application May 23, 1932, Serial No. 612,884

10 Claims. (Cl. 259—85)

This invention relates to food mixers and more particularly to a food mixer having a support including a shifter plate for moving the mixing bowl and its supporting dished plate into any desired position relatively to the agitators or beaters of the food mixer.

The object of the invention is to provide means whereby the mixing bowl may be moved, gradually, laterally of the agitators or beaters of the mixer, so that the beaters may be operated at the center of the bowl or at any point intermediate the center and the circumferential wall of the bowl. Thus, if the bowl is revolved, either automatically or manually, while held in any desired radial position relatively to the beaters, all of the material in the bowl will be put into contact with the beaters and the mixing time reduced.

I have found that if a mixing bowl is revolved about a fixed axis and the bowl is positioned so that the beaters are operating adjacent the side walls of the bowl, the materials being mixed will work toward the center of the bowl and become piled up at the center, out of contact with the beaters. The provision of means for gradually moving the bowl laterally back and forth, relatively to the beaters, causes the material lying in different annular paths in the bowl to receive the full benefit of the mixing devices.

Another advantage of the construction is that the bowl may be revolubly held in any desired position. If the consistency of the material being treated is such that the bowl will revolve too rapidly when the bowl is so positioned that the agitators are adjacent the side walls, then the shifter plate may be operated to move the bowl into a position wherein the beaters are close to or relatively close to the center of the bowl, whereby the revolving speed of the bowl will be reduced. This will be understood by reference to my co-pending application Serial No. 612,881, filed May 23, 1932, wherein I disclose means for automatically revolving the mixing bowl.

In the drawing:—

Fig. 1 is a side elevation of a combination food mixer and juice extractor carried on a support which embodies my invention.

Fig. 2 is an enlarged sectional view, taken on the line 2—2 of Fig. 3, showing the base of the support and having a bowl and bowl-carrying dished plate mounted on the base.

Fig. 3 is a sectional view taken on the line 3—3 of Fig. 1.

Fig. 4 is a plan view of the base showing a modification of the invention.

As illustrative of the device in which is embodied the invention sought to be protected by this application, I have shown in Fig. 1 a combination food mixer and juice extractor, in which the horizontally disposed base is indicated at 10, an upright socket, integral with the base, at 11, a pivotally mounted arm at 12, and a motor driven food mixer, detachably mounted on the arm, at 13. The food mixer comprises a motor 14, carrying a gear casing 15, and a detachable agitator or beater unit 16. The motor is operatively connected with the agitators beneath the gear casing and with the juice extractor above the gear casing. The gear casing 15 is provided with a socket 17 which receives the coupling which operatively and removably connects the reamer drive shaft to a driven shaft in the gear casing. The reamer drive shaft and coupling carry the supporting and clamping device 18 for the bowl 19. The bowl is provided with a spout 20. The food mixer bowl is indicated at 21, and a handle on the motor, at 22.

It will be understood that the invention herein shown, described and claimed may be embodied in food mixers of various constructions, and is not limited to the particular combination in which it is illustrated herein, in Fig. 1.

Novel features of construction of the combination food mixer and juice extractor, not claimed herein, are the subject of applications co-pending herewith.

Referring now to that part of the construction which is the subject of this invention, and particularly to the form shown in Figs. 1 to 3, inclusive, the base 10 comprises a top 23 having a circular opening cut therein to receive a shifter plate 24. The plate 24 is located eccentrically of that part of the base top 23, shown in Fig. 3, located forwardly of the socket 11. The top 23 is provided with a flange 25 and legs 26.

The shifter plate 24 consists of an upper disc 27 and a lower disc 28, the latter being provided, integrally, with an actuating lever 29. The upper disc 27 has a circumferential flange 30 depending from its lower surface, slightly inwardly of its peripheral margin which is seated on the annular shoulder 31 formed on the edge of the circular opening in the base top 23. The disc 27 is provided with a depending, open top bearing receptacle 32 located adjacent the peripheral edge of the disc, the lower edge of the receptacle 32 being inturned as indicated at 33. A socket 34, internally screw threaded, is formed on the lower surface of the disc 27, centrally thereof, for the reception of the headed screw 35. The lower disc 28 is apertured adjacent its edge to accommodate the depending bearing receptacle 32, and is centrally apertured and dished at 36 to accommodate the socket 34. The screw 35 and washer 37 hold the lower disc 28 in place. Preferably a coiled spring 38 is placed between the dished surface 36 of the lower disc 28 and the washer 37, whereby the disc 28 is held in frictional engagement with the shoulder 39 on the part 23, and prevented from unintentional movement when put into a certain position by the actuating of the lever 29 of the lower disc 28.

The base flange 25 is cut away to form stop shoulders 40 (Fig. 1) which limit the manual movement of the lever 29.

A dished plate 41, for supporting the bowl 21, is provided with a hub 42 surrounded by upper and lower sets of ball bearing raceways 43, which fit into the aperture of the bearing receptacle 32 of the shifter plate 24.

The ball bearing unit, comprising the hub 42 and ball bearings 43, is of great advantage in insuring easy revolution of the bowl carrying plate 41, particularly at the beginning of the mixing operation, when the materials in the bowl are not uniformly distributed as to weight, and the bowl is not perfectly balanced.

When the shifter plate 24 (comprising the discs 27, 28, and lever 29) are in the position shown in full lines in Fig. 3, the bowl supporting dished plate 41, with bearing unit 42—43 in the shifter plate bearing receptacle 32, will hold the bowl 21 in such position that the center of the bowl will be approximately beneath the center of the agitator unit 16. This will be true regardless of the size of the bowl 21 because the latter will be seated centrally of the dished plate 41, and, therefore, the axes of the bowl, the hub 42 and bearing receptacle 32 will be approximately coincident.

To move the bowl 21 relatively to the mixer unit 16, the lever 29 may be moved to the dotted line position of Fig. 3, or to any intermediate point between the shoulders 40, with the result that the shifter plate 24 will be revolved about the axis of the screw 35 and socket 34, and the bearing receptacle 32 carrying the dished plate bearing unit 42—43 will be moved from the full line position of Fig. 3 to the dotted line position, or to any intermediate position.

The movement described brings into operative contact with the beaters of the mixer 13, all the material lying in different annular paths. The adjustment of the shifter plate 24 by actuating the lever 29 fixes the relative positions of the agitators 16 and bowl 21, and consequently establishes the annular path to be traversed by the beaters, and the manual or automatic revolving of the bowl about the axis of the bowl insures mixing of all the material lying in whatever annular path is being traversed by the beaters, depending on the location of the shifter plate.

In Fig. 4 is shown a modified form of shifter plate mounted in the top 23 of the base 10. The top 23 is slotted at 44 to receive a plate 45 slidably mounted on the flange 46 on the part 23. The lever 47 is actuated to move the plate 45 back and forth. A bearing receptacle 48, similar to the member 32 of Fig. 3, is adapted to receive the bearing unit 42—43 of the bowl supporting plate 41.

Changes may be made in details of construction without departing from the scope of my invention and I do not intend to be limited to the exact form shown and described, except as set forth in the appended claims.

I claim:—

1. A food mixer comprising an agitator, means for driving the same, a base, a support for holding the mixer in raised position relatively to the base, the base having a circular opening therein, a flange on the edge defining the opening, a shifter plate located in the opening, and comprising a pair of discs connected together and bearing marginally on opposite sides of the flange of the base, an eccentrically located bearing socket depending from the upper disc, and an actuating lever extending laterally from the lower disc.

2. A food mixer comprising a base, an arm extending upwardly from the base, a power unit supported on the arm and overhanging the base, an agitator depending from the power unit, a bowl-supporting turntable, a shifter plate reciprocably mounted in the base, means for rotatably mounting the turntable on the shifter plate, and means for gradually shifting the position of the shifter plate relatively to the base and laterally of the agitator during operation of the agitator.

3. A food mixer comprising a base, an arm extending upwardly from the base, a power unit supported on the arm and overhanging the base, an agitator depending from the power unit, a bowl-supporting turntable, a shifter plate rotatably mounted in the base, means for mounting the turntable on the shifter plate eccentrically to the shifter plate, and a lever connected to the shifter plate for rotating the shifter plate and thereby gradually shifting the position of the turntable relatively to the base and laterally of the agitator.

4. A food mixer comprising a base, an arm extending upwardly from the base, a power unit supported on the arm and overhanging the base, an agitator depending from the power unit, a bowl-supporting turntable having a depending hub, a shifter plate rotatably mounted in the base, an eccentrically located bearing receptacle in the shifter plate for receiving the turntable hub, and a lever connected to the shifter plate for rotating the shifter plate and thereby gradually shifting the position of the turntable relatively to the base and laterally of the agitator.

5. A food mixer comprising a base, an arm extending upwardly from the base, a power unit supported on the arm and overhanging the base, an agitator depending from the power unit, the power unit being swingable relative to the base, a bowl supporting plate, means guidably embracing side portions of said plate on the base to constitute a functional part of said base, and means for gradually reciprocating the bowl supporting plate laterally of the agitator, said means comprising a lever mounted in the base and extending through an opening therein for manual operation of said plate.

6. A food mixer comprising a hollow base, an arm extending upwardly from the base, a power unit supported on the arm and overhanging the upper surface of the base, an agitator depending from the power unit, a plate mounted for reciprocal movement and having means extending into the base, a bowl support rotatably mounted on said plate, and means within the hollow base and operatively connected to said plate for bodily shifting the position of the bowl support relatively to the base and laterally of the agitator while the mixing operation is carried on.

7. A food mixer comprising a base, an arm extending upwardly from the base, a power unit supported on the arm and overhanging the base, an agitator depending from the power unit, a bowl-supporting plate guidably mounted on the base, and means for gradually shifting the position of the bowl supporting plate on its mounting and laterally of the agitator while the mixing operation is carried on, said means comprising a lever mounted within the base and extending through an opening therein for manual operation of said plate.

8. A food mixer comprising a base, an arm extending upwardly from the base, a power unit supported on the arm and overhanging the base, an agitator depending from the power unit, a support mounted on the base for reciprocatory movement, adjusting means operatively connected to said support to move the same relative to the base and to said agitator during normal operation of the mixer, and a bowl holder carried by said support and mounted for independent movement relative to said support.

9. In a mixing machine having a base and a laterally fixed mixing implement, a turntable having concentric flanges for receiving and restraining vessels of different diameters, said turntable having a central stud, and a member pivoted to said base and having a hole for the reception of said stud and in which said stud is freely rotatable, said member having an operating handle extending therefrom beyond the base, whereby said vessels may be located with respect to said mixing implement during operation of the mixing implement.

10. A food mixer comprising a base, an arm extending upwardly from the base, a power unit supported on the arm and overhanging the base, an agitator depending from the power unit, a freely rotatable bowl supporting plate guidably mounted on the base, a mixing bowl mounted thereon, means for gradually shifting the position of the bowl supporting plate on its mounting and with respect to the agitator while the mixing operation is carried on, said means comprising a lever mounted on the base and extending therefrom for manual operation of said plate.

EDWARD MROSS.